United States Patent [19]

Inagaski et al.

[11] Patent Number: 4,966,494
[45] Date of Patent: Oct. 30, 1990

[54] LOW LOAD PIPE FOR PIPE JACKING

[75] Inventors: Hiroyoshi Inagaski; Masataka Fukami; Kenji Kondo, all of Osaka, Japan

[73] Assignee: Kurimoto Ltd., Osaka, Japan

[21] Appl. No.: 276,457

[22] Filed: Nov. 28, 1988

[30] Foreign Application Priority Data

Dec. 9, 1987 [JP] Japan ............................ 62-187305[U]

[51] Int. Cl.$^5$ ............................................... F16L 1/00
[52] U.S. Cl. .................................... 405/184; 405/145; 285/230
[58] Field of Search ..................... 405/184, 145, 135; 285/288, 230, 291

[56] References Cited

U.S. PATENT DOCUMENTS 3,567,233 3/1971 Stepanich .
4,361,336 11/1982 Reeh et al. ........................ 285/230 X
4,808,032 2/1989 John ..................................... 405/184

FOREIGN PATENT DOCUMENTS 0240072 10/1987 European Pat. Off. .
0247496 12/1987 European Pat. Off. .
1095872 12/1967 United Kingdom .
1509868 5/1978 United Kingdom .
1590782 6/1981 United Kingdom .

Primary Examiner—Dennis L. Taylor
Assistant Examiner—J. Russell McBee
Attorney, Agent, or Firm—Jones, Tullar & Cooper

[57] ABSTRACT

When carrying out replacement of an old main with a new one while crushing the old pipe line by a pipe jacking construction method in which the pipe line is formed by inserting pipes one by one horizontally from a launch pit without excavating the ground, application of low load is sufficient for forward movement of new main. Accordingly, a pipe for pipe jacking is able to endure to low load. Thus, there is provided an improved pipe for pipe jacking.

6 Claims, 3 Drawing Sheets

A

B

LOW LOAD PIPE FOR PIPE JACKING

BACKGROUND OF THE INVENTION

1. Field of the invention

The present invention relates to a pipe of socket and spigot type adapted for pipe jacking having a spigot whose internal and external diameters are larger than those of the pipe body.

2. Prior art

So-called pipe jacking is a method in which, for burying a water main, the rear end of a metal straight pipe is almost horizontally inserted in the earth at a launch pit with pressure applied by a hydraulic jack or the like without excavating the ground, then the spigot of the next straight pipe is joined in the socket at the rear end of the preceding pipe, These pipes are also inserted in the earth with pressure applied by the hydraulic jack. These steps are repeated to form a required pipe line.

In this method, however, a drawback exists in that because of the enlarged spigot of the pipes, considerable resistance is unavoidable when carrying out forward movement under the ground. To overcome such a drawback, a countermeasure is employed, wherein a flange is circumferentially provided on the spigot of each pipe so as to a receive a driving force through a flange portion on the end face of a preceding pipe, and furthermore the outer periphery of the pipe is coated with cement mortar in such a manner that the outer periphery of the pipe between the flange on the spigot and the socket may be almost equivalent to the largest external diameter of the socket. Other countermeasures such as welding of ribs between the flange on the spigot and pipe body, incorporation of reinforcing rods in the coating cement mortar were also adopted in view of reinforcement.

These conventional and customary pipes for pipe jacking still have various disadvantages caused by the instability of the cement-mortared surface, intricate manufacturing or assembling processes, etc., and therefore to meet such disadvantages the applicant already proposed an improved pipe adapted for pipe jacking as is disclosed in Japanese Utility Model Registration Application No. 62-13065 as illustrated in FIG. 6. This preceding improved pipe adapted for pipe jacking is featured in that the spigot 4a is provided with an annular flange 12 and reinforced with a rib 13, and an outer pipe 5a having a smooth external surface is fixedly placed at the outer edge between the spigot 4a and that of the socket in longitudinal direction. Furthermore an annular gap formed between the outer pipe and the pipe body is filled with a filler 6a such as sand or foaming mortar. As a result of such features, several advantages are achieved such that frictional resistance between the outer surface of the pipe and earth is reduced enabling the pipe to be easily moved forward by pipe jacking, with loss of the cement mortar being prevented, and manufacturing as well as pipe carrying being easily achieved.

It is certain that the preceding improved pipe adapted for pipe jacking overcomes the disadvantages of the known and customary pipe coated with cement mortar, but in view of recent remarkable progress in the field of pipe line laying method which has brought several conditions largely different from the conventional pipe jacking, it is now necessary to review requirements of the pipe. For example, a pipe replacement method without open cut has been put into practical use. According to this new pipe replacement method, when an old pipe line becomes obsolete, the old pipe line is replaced with a new one while crushingly removing the former, being different from the conventional pipe jacking which is employed only when new pipe line is constructed without excavation.

FIGS. 7 A and 7 B show a specific example of such a new pipe replacement method. In FIG. 7 A, a mole 15 moves forward into an old pipe line 14 while crushing it, then temporary pipes 16 to be connected to the rear part of the mole and moved following the mole are placed one by one in the area where old pipes have been crushed. Then, as illustrated in FIG. 7 B, after completing replacement of the old pipe line with such temporary pipes over the full length, new pipes 1b to be jacked are inserted one by one from a launch pit 17 and the rear part of the pipes 1b is pushed forward by a hydraulic jack 18, whereby the first temporary pipe 16 is pushed out to a reception pit 19 to be removed up to the outside. These steps are repeated to complete replacement of the temporary pipes with a new pipe line.

In the pipe jacking as described above, since new pipe to be jacked is moved forward in the horizontal cavity already provided under the ground by the old pipe line while pushing temporary pipes and/or preceding pipe to be jacked, the required jacking force can be much smaller than that in the conventional pipe jacking. Accordingly, it is not always reasonable to provide a circumferential flange on the spigot of such new pipe for preparation of external arrangement and, moreover, in the assembling process, it will be difficult to carry out fitting such outer pipe serving as an outer casing over the pipe body if a flange or rib is provided beforehand. In particular, it will actually be very troublesome work to fill closed space partitioned by the flange on the spigot, socket and pipe with a filler while exhausting the air therefrom.

Even in the conventional construction using pipe jacking, the pipe jacking distance may be sometimes short when carrying out such a construction as in just crossing road or a railroad, in which the required jacking force can be very small. In such a case, it is also not always reasonable to provide a circumferential flange on the spigot for the preparation of external arrangement.

SUMMARY OF THE INVENTION

The present invention was made to solve the above-discussed problems and has as an object to provide an improved pipe of low load for pipe jacking.

In order to achieve the foregoing object, in the low load pipe for pipe jacking according to the present invention, an outer pipe having a smooth external surface and an external diameter almost equal to a maximum external diameter of a socket of the pipe is mounted on the outer periphery of a pipe body having a socket whose length is a little longer than the enlarged diameter portion of the socket section, and a gap between the outer periphery of the pipe body and the outer pipe is filled with a filler in such a manner as to be retained.

More specifically, it is preferable that the filler is a self-curing material. It is also preferable that either an area in the vicinity of an end of the outer pipe on the spigot of the internal pipe or areas in the vicinity of both ends thereof are filled with a filler of self-curing material, and the remaining area is filled with a filler of nonself-curing material It is further preferable that the end of the outer pipe on the spigot side of the internal pipe is bent toward its axis to contact the outer periphery of the internal pipe. It is yet further preferable that the inner periphery of the outer pipe is provided with annularly projecting rails.

Since it is sufficient for the pipe adapted for pipe jacking according to the present invention to meet the minimum requirements for endurance to low load as mentioned above, the manufacturing process thereof is simple and weight is reduced which is advantageous for transportation and construction.

As for the advantages in the manufacturing or assembling process of pipe, since the spigot is not provided with a flange or rib, mounting of the outer pipe on the inner pipe is easy.

It is also advantageous that the filler can be vertically poured into an annular gap formed between the outer pipe and pipe body by erecting the pipe body with its socket down on the ground and mounting the outer pipe on the outer periphery of the pipe body. This filler pouring method is far more advantageous than the conventional method (FIG. 6) of horizontally filling the closed space with filler.

As for the advantages in and after the construction process, a pipe is joined to a preceding pipe in a line contact at the front end of the spigot section according to the invention, this being different from the joint in the form of a face contact between the flange portion on the socket end face and the flange fixed to the spigot in the prior art, thus some flexibility is given to the line contact portion to the extent of being capable of following a certain irregularity occurring in the forward movement of the pipes.

Furthermore, when it becomes unexpectedly necessary to fabricate a shorter pipe by cutting a standard length pipe at the construction site, it is no longer required to fix the flange and rib onto the spigot side of the shortened pipe as is done in the prior art, and therefore any shorter pipe can be easily fabricated at the construction site and the equipment necessary for such fabrication can be simplified.

BRIEF DESCRIPTION OF THE DRAWINGS

In the drawings forming a part of the present application,

FIG. 3 B is a front view showing the flange of the outer pipe in more detail;

DESCRIPTION OF THE PREFERRED EMBODIMENTS

Figure 1:
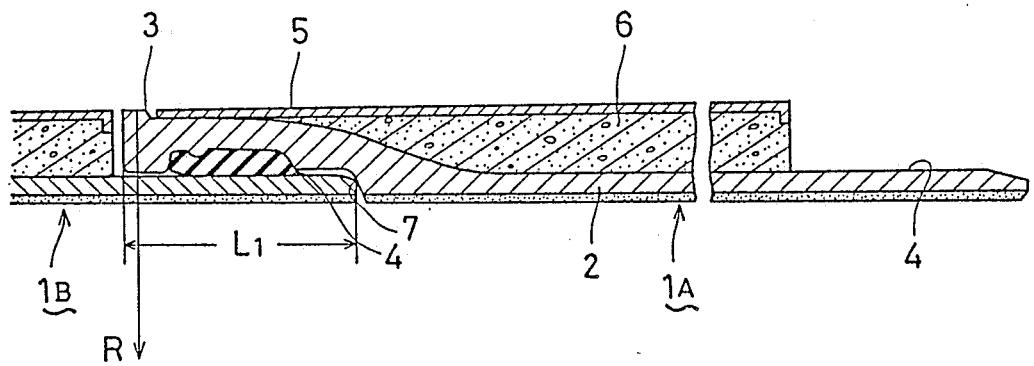
FIG. 1 is a front sectional view illustrating an embodiment of the present invention.

Described hereinafter with reference to FIG. 1 is an embodiment of the present invention. A pipe 1 for pipe jacking comprises a straight pipe body 2 and a socket 3 having internal and external diameters both larger than those of the pipe body 2. Another end of the pipe body 2 is a spigot 4 to be inserted and joined into the socket of a preceding pipe.

The outer periphery of the pipe 1 is covered with an outer pipe 5 having a smooth external surface and an external diameter almost equal to the maximum external diameter R of the socket in such a manner that the spigot section 4 may be slightly longer than the enlarged portion L1 of the inner diameter of the socket, and further a gap between the outer pipe 5 and the outer periphery of the pipe body 2 is filled with a filler 6 which is retained.

In this manner a preceding pipe 1A comes in contact with a succeeding pipe 1B receiving a pressing force from the rear at the deepest part of the socket of the preceding pipe 1A. The pressing force is transmitted from a circumference formed of the front end 7 of the spigot 4 of the succeeding pipe 1B to the circumference of the deepest part of the socket section of the preceding pipe 1A. In the low load pipe jacking method as in this embodiment, transmission of the pressing force in the form of the tangential line between the front end of the spigot section and the deepest part of the socket section is quite sufficient for the intended performance. It is also satisfiable for an additional part (outer pipe and filler) to the outer periphery to absorb increasing resistance during the forward movement by pipe jacking increasingly produced as a result of enlargement of the diameter of the socket, and reduce the resistance with their smooth surface.

Figure 2:
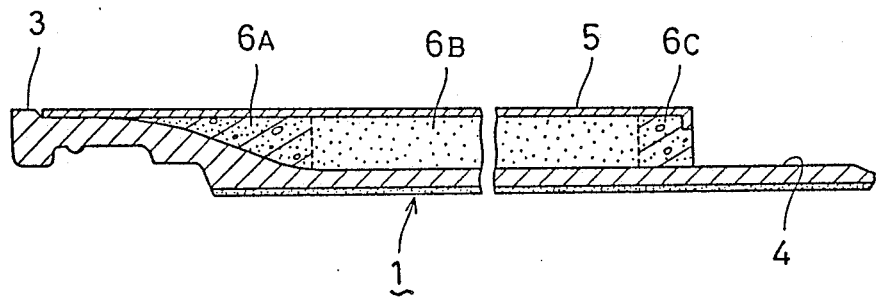
FIGS. 2, 3 A and 4 are side sectional views respectively illustrating further embodiments of the invention.

Since the additional part to the outer periphery of the pipe is not required to perform a securing strength function for the internal section of the outer pipe 5 such as spiral duct having a smooth surface or a vinyl chloride pipe, can be satisfiably filled with adequate filler, and preventing loss of the filler is an only requirement. To meet this requirement, it is customary to use such self-curing material as cement mortar, resin mortar, foaming cement. It is also preferable that, as illustrated in FIG. 2, the socket side 6A is filled with mortar, the intermediate section 6B with sand, and the spigot side 6C with mortar, respectively. It is further preferable that only the spigot side 6C is filled with mortar and the remaining parts with sand.

Figure 3A:
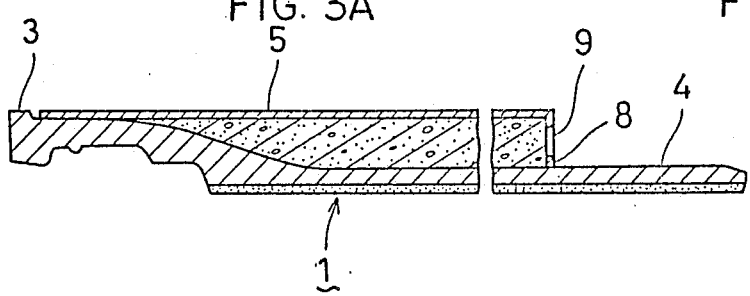
Figure 3B:
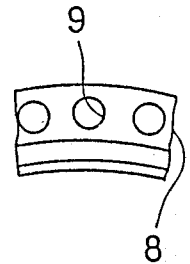

FIG. 3 shows another embodiment in which the end of the outer pipe 5 on the spigot side of the pipe 4 is bent toward the axis to form a flange 8 in contact with the outer periphery of the pipe 4. Filler is confined within the pipe 5 by this flange. In this embodiment, it is necessary to provide a hole 9 through which air inside is exhausted and filler is poured into the pipe.

Figure 4:
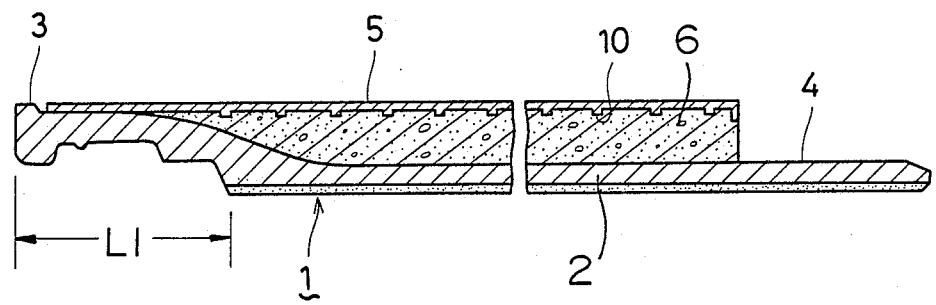
Figure 5A:
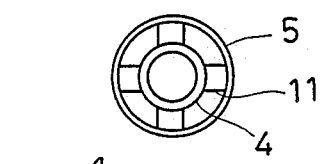
FIGS. 5 A is a top view and 5 B are partially sectional front view, respectively illustrated to explain the embodiments of the invention.
Figure 5B:
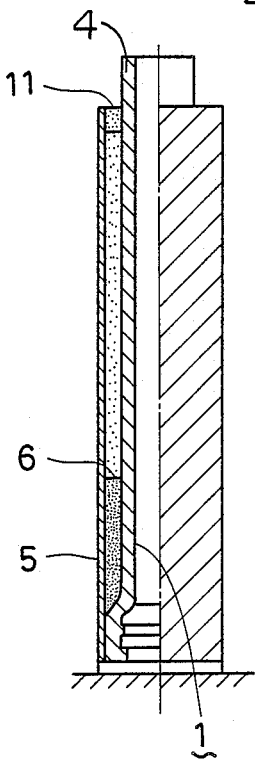
Figure 6:
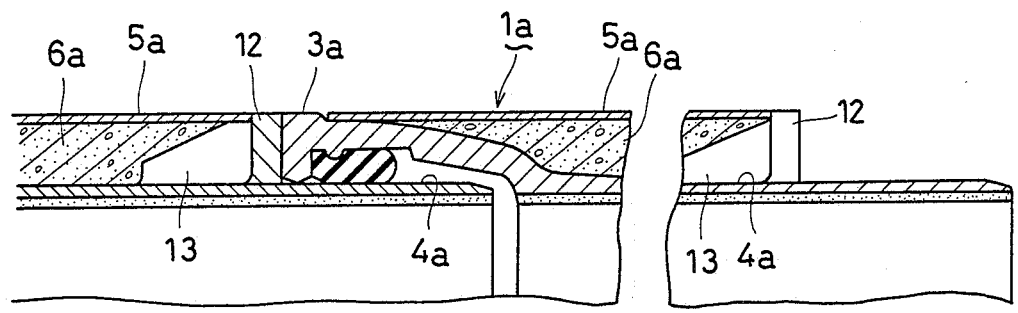
FIG. 6 is a side sectional view illustrating a prior art.
Figure 7:
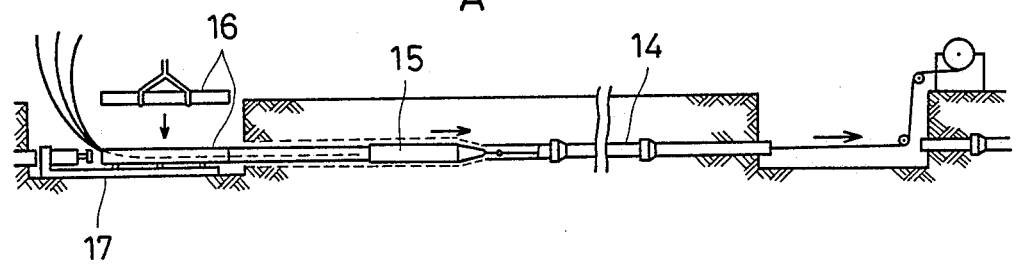
FIG. 7 A and 7 B are side partial sectional views illustrating the recent pipe line replacement method without open cut.
Figure 7:
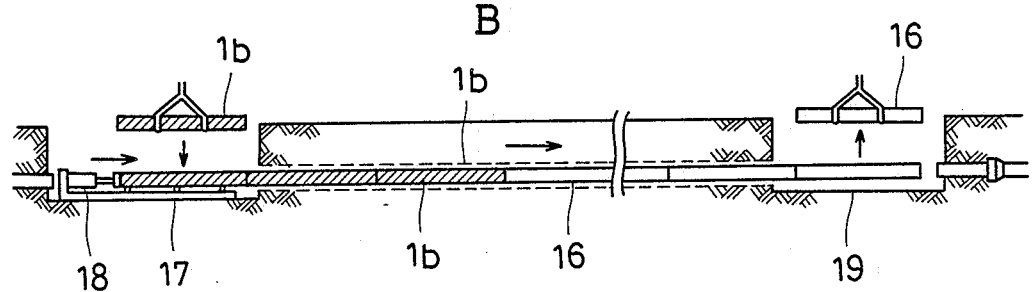

FIG. 4 shows a further embodiment in which a plurality of projecting rails 10 are annularly provided on the inner periphery of the outer pipe 5. As in FIG. 1, the spigot section 4 may be slightly longer than the enlarged portion L1, and the gap between the outer pipe 5 and the outer periphery of the pipe body 2 is filled with a filler 6 which is retained. The annular rails 10 proivde good adherence of the outer pipe 5 to the filler 6. This proves helpful when it is considered that the outer surface of the outer pipe 5 engages the surrounding soil during the jacking process. Also, if a detachment of the outer pipe 5 did occur with respect to the filler 6, the ribs 10 would prevent relative movement of the two.

Described hereafter are advantages peculiar to the foregoing respective embodiments. In the embodiment with reference to FIG. 2, as the intermediate part is filled with sand, what is required for joining a branch pipe to the pipe bosy is only cutting the outer pipe and removal of sand from inside. When lifting a pipe to carry it, the thin outer pipe is prevented from deformation due to dead weight just by putting a wire round the mortared part.

In the embodiment shown in FIG. 3, positioning is easily carried out just by engagedly mounting the outer pipe 5 on the pipe, which results in easy manufacturing or assembling.

In the embodiment shown in FIG. 4, as the retaining function between the outer pipe 5 and the filler 6 is increased, there is no such disadvantage as displacement or burr of the outer pipe due to frictional resistance in the construction process.

What is claimed is:

1. A low load pipe for pipe jacking, comprising:

a pipe body having an internal diameter and an external diameter, said pipe body including a socket section with a projecting annular rib at an external edge of the socket defining an external diameter, and a spigot section with an outer periphery;

said socket section having an internal diameter and an external diameter larger than the external diameter of said pipe body, and said spigot section having a length slightly longer than the length of the socket section; and an outer pipe having a smooth external surface and an external diameter almost equal to the external diameter of said projecting annular rib, and a plurality of projecting outer rails projecting from its internal diameter, said pipe body, with said socket section and said spigot section, defining a gap with said outer pipe which is filled with a filler material which adheres to said projecting rails, said filler material being retained in said gap.

2. The low load pipe as defined in claim 1, wherein said outer pipe includes a bent portion at one end which contacts the outer periphery of said pipe body.

3. The low load pipe as defined in claim 2, wherein said bent portion includes at least one hole.

4. The low load pipe as defined in claim 1, wherein the filler material comprises a self-curing material.

5. The low load pipe as defined in claim 4, wherein said outer pipe includes a bent portion at one end which contacts the outer periphery of said pipe body.

6. The low load pipe as defined in claim 5, wherein said bent portion includes at least one hole.

* * * * *